(12) United States Patent
Ho et al.

(10) Patent No.: US 7,616,403 B2
(45) Date of Patent: Nov. 10, 2009

(54) WINGED DESIGN FOR REDUCING CORNER STRAY MAGNETIC FIELDS

(75) Inventors: Kuok San Ho, Santa Clara, CA (US); Yimin Hsu, Sunnyvale, CA (US); Masafumi Mochizuki, Koganei (JP); Ching Hwa Tsang, Sunnyvale, CA (US); Roger Wood, Gilroy, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 299 days.

(21) Appl. No.: 10/977,315

(22) Filed: Oct. 29, 2004

(65) Prior Publication Data

US 2006/0092562 A1    May 4, 2006

(51) Int. Cl.
G11B 5/127    (2006.01)
G11B 5/147    (2006.01)

(52) U.S. Cl. ............... 360/125.01; 360/125.33; 360/125.72; 360/122

(58) Field of Classification Search .......... 360/122, 360/125, 126, 235.4, 236.4, 236.5, 123.12, 360/123.37, 123.58, 125.01, 125.27–125.29, 360/125.38–125.4, 125.67–125.7, 125.02, 360/125.3, 125.33, 125.72
See application file for complete search history.

(56) References Cited

U.S. PATENT DOCUMENTS

| 4,725,909 | A | | 2/1988 | Kawai |
| 4,916,563 | A | * | 4/1990 | Kawase ............... 360/122 |
| 4,939,609 | A | | 7/1990 | Zieren et al. |
| 5,073,836 | A | | 12/1991 | Gill et al. |
| RE33,949 | E | | 6/1992 | Mallary et al. ............ 360/110 |
| 5,200,056 | A | | 4/1993 | Cohen et al. |
| 5,208,715 | A | | 5/1993 | Mowry |
| 5,220,473 | A | * | 6/1993 | Brock et al. ............... 360/121 |
| 5,495,379 | A | | 2/1996 | McNeil et al. ............. 360/125 |
| 5,680,283 | A | | 10/1997 | Tanaka et al. |
| 5,754,376 | A | | 5/1998 | Kobayashi et al. |
| 5,854,727 | A | * | 12/1998 | Tanaka et al. ............. 360/125 |
| 5,910,868 | A | | 6/1999 | Kurosawa et al. |
| 5,920,449 | A | | 7/1999 | Tagawa ................... 360/122 |
| 5,923,502 | A | | 7/1999 | Christensen et al. |
| 5,986,856 | A | | 11/1999 | Macken et al. |
| 5,995,341 | A | | 11/1999 | Tanaka et al. |
| 6,032,353 | A | | 3/2000 | Hiner et al. |
| 6,074,767 | A | | 6/2000 | Lin |
| 6,097,578 | A | * | 8/2000 | Pokhil ..................... 360/319 |
| 6,122,144 | A | * | 9/2000 | Chang et al. ............. 360/122 |
| 6,158,107 | A | * | 12/2000 | Chang et al. ............ 29/603.14 |
| 6,230,389 | B1 | | 5/2001 | Zhu |
| 6,333,841 | B1 | | 12/2001 | Sasaki |
| 6,339,524 | B1 | * | 1/2002 | Furusawa et al. .......... 360/317 |
| 6,373,657 | B1 | | 4/2002 | Kamijima |
| 6,411,464 | B1 | | 6/2002 | Fujii et al. |
| 6,459,543 | B1 | | 10/2002 | Sasaki |

(Continued)

FOREIGN PATENT DOCUMENTS

EP    1647973 A2    4/2006

(Continued)

Primary Examiner—Andrea Wellington (57) ABSTRACT

Embodiments of the present invention are directed to structures of a recording head having a winged design for reducing corner stray magnetic fields. In one embodiment, the present invention comprises a magnetic recording head comprising a plurality of components. In embodiments of the present invention at least one of the plurality of components comprises a surface exposed to an air bearing surface when in operation with a recording medium. The surface exposed to the air bearing surface comprises notched edges for constraining corner stray magnetic fields associated therewith.

20 Claims, 10 Drawing Sheets

U.S. PATENT DOCUMENTS

| | | | |
|---|---|---|---|
| 6,473,265 B1 | 10/2002 | Zhou et al. | |
| 6,525,904 B1 * | 2/2003 | Sasaki | 360/125.65 |
| 6,589,436 B1 | 7/2003 | Tabib et al. | |
| 6,603,637 B1 | 8/2003 | Segar et al. | |
| 6,608,735 B1 | 8/2003 | Serpe et al. | |
| 6,624,971 B1 | 9/2003 | Sasaki | |
| 6,742,241 B1 * | 6/2004 | Sasaki | 29/603.07 |
| 6,804,088 B1 * | 10/2004 | Nonaka et al. | 360/317 |
| 6,826,014 B2 | 11/2004 | Lam et al. | |
| 6,879,462 B2 * | 4/2005 | Otsuka | 360/125.3 |
| 6,888,702 B2 | 5/2005 | Sato et al. | |
| 6,914,749 B2 | 7/2005 | Chang et al. | |
| 7,019,944 B2 * | 3/2006 | Matono et al. | 360/126 |
| 7,068,453 B2 * | 6/2006 | Terris et al. | 360/59 |
| 7,140,095 B2 * | 11/2006 | Matono | 29/603.15 |
| 7,372,664 B1 * | 5/2008 | Mallary et al. | 360/125.01 |
| 7,508,628 B2 * | 3/2009 | Che et al. | 360/125.16 |
| 2002/0024755 A1 | 2/2002 | Kim et al. | 360/55 |
| 2002/0027750 A1 | 3/2002 | Shukh et al. | |
| 2002/0044379 A1 * | 4/2002 | Kobayashi et al. | 360/126 |
| 2002/0053130 A1 | 5/2002 | Sasaki | |
| 2002/0145832 A1 * | 10/2002 | Seigler et al. | 360/313 |
| 2003/0021064 A1 | 1/2003 | Ohtomo et al. | |
| 2003/0099069 A1 | 5/2003 | Kagami et al. | |
| 2003/0193742 A1 | 10/2003 | Matono et al. | |
| 2004/0004787 A1 * | 1/2004 | Matono et al. | 360/126 |
| 2004/0061976 A1 | 4/2004 | Nakayama | |
| 2004/0071017 A1 | 4/2004 | Seigler et al. | |
| 2004/0075927 A1 | 4/2004 | Gill | |
| 2004/0190205 A1 | 9/2004 | Miyauchi | |
| 2005/0002124 A1 | 1/2005 | Bunch et al. | |
| 2005/0018348 A1 * | 1/2005 | Lille et al. | 360/128 |
| 2005/0068671 A1 * | 3/2005 | Hsu et al. | 360/125 |
| 2005/0264930 A1 * | 12/2005 | Gider et al. | 360/125 |
| 2005/0280935 A1 * | 12/2005 | Clinton et al. | 360/125 |
| 2006/0092565 A1 * | 5/2006 | Ho et al. | 360/126 |
| 2006/0092566 A1 * | 5/2006 | Ho et al. | 360/126 |
| 2006/0092569 A1 * | 5/2006 | Che et al. | 360/128 |
| 2006/0098338 A1 * | 5/2006 | Watabe et al. | 360/126 |
| 2006/0176614 A1 * | 8/2006 | Matono | 360/126 |
| 2006/0221497 A1 * | 10/2006 | Okada et al. | 360/125 |
| 2006/0250712 A1 * | 11/2006 | Matono et al. | 360/1 |
| 2007/0230045 A1 * | 10/2007 | Hsiao et al. | 360/126 |
| 2007/0242392 A1 * | 10/2007 | Benakli | 360/319 |

FOREIGN PATENT DOCUMENTS

| | | | |
|---|---|---|---|
| JP | 58175118 | | 10/1983 |
| JP | 63081617 | | 4/1988 |
| JP | 63195818 | | 8/1988 |
| JP | 2010509 | | 1/1990 |
| JP | 03280208 A | | 12/1991 |
| JP | 6180810 | | 6/1994 |
| JP | 2001023115 | * | 1/2001 |
| JP | 2001266310 | | 9/2001 |

\* cited by examiner

WINGED DESIGN FOR REDUCING CORNER STRAY MAGNETIC FIELDS

RELATED APPLICATIONS

The present invention benefits from U.S.P.T.O. applicaton Ser. No. 10/977,446, filed Oct. 29, 2004, entitled "Double Notched Shield and Pole Structure for Stray Field Reduction in a Magnetic Head," by Kuok San Ho (Michael Ho) Yimin Hsu, and Ching Tsang, assigned to the assignee of the present invention, and which is hereby incorporated by reference in its entirety herein.

The present invention benefits from U.S.P.T.O. application Ser. No. 10/976,479, filed Oct. 29, 2004 entitled "Notched Shield and Pole Structure with Slanted Wing for Perpendicular Recording" by Kuok San Ho (Michael Ho), Yimin Hsu, and Ching Tsang, assigned to the assignee of the present invention, and which is hereby incorporated by reference in its entirety herein.

The present invention benefits from U.S.P.T.O. applicaton Ser. No. 10/976,478, filed Oct. 29, 2004, entitled "Winged Pole and Shield Structure for Reduced Stray Field in a Perpendicular Write Head," by Xiaodong Che, Hardayal Gill, Wen-Chien Hsiao, Yansheng Luo, and Xiaoyu Sui, assigned to the assignee of the present invention, and which is hereby incorporated by reference in its entirety herein.

FIELD OF THE INVENTION

The present invention relates to magnetic storage devices. More specifically, embodiments of the present invention are directed to reducing corner stray magnetic field effects related to recording heads used in magnetic storage devices.

BACKGROUND OF THE INVENTION

Figure 1A:
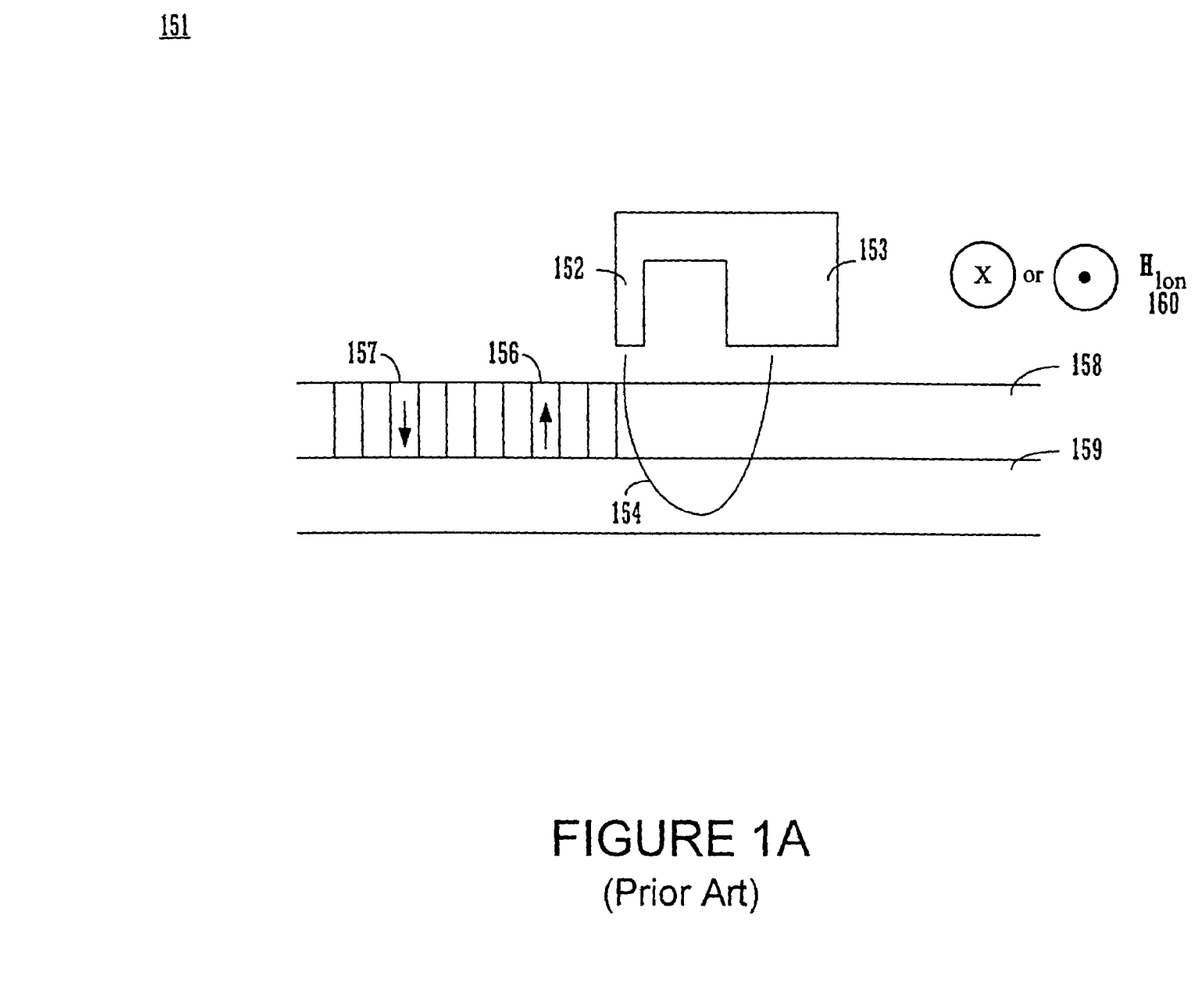
FIG. 1A is a cross section view of exemplary conventional perpendicular recording system.

Magnetic storage devices (e.g., hard disk drives, etc.) typically use an inductive ring head to write data using magnetic fields on a recording medium. Longitudinal storage systems typically write the magnetic elements such that the polarity of the magnetic elements is parallel with the surface of the recording medium. Perpendicular recording systems typically write the data such that the polarity of the magnetic elements are perpendicular to the surface of the recording medium and therefore more dense. FIG. 1A shows an exemplary perpendicular recording system.

Perpendicular recording system 151 comprises a write head (e.g., a monopole inductive element) having a main pole 152 and a return pole 153. When a current is passed through the coil of the main pole 152 a field 154 is created. In a typical perpendicular recording system, a soft underlayer 159 is disposed beneath recording medium 158 and creates a return path for field 154 to return to return pole 153. Depending upon the polarity of a field 154, a magnetic elements (e.g., 156 and 157) is altered on recording medium 158. For example, the polarity of field 154 causes the north pole and south pole of element 156 to be aligned in a first direction. However, changing the polarity of field 154 when writing element 157 results in an opposite polarity so that the north pole and south pole are aligned in an opposite direct on to that of element 156.

Perpendicular storage systems facilitate greater storage density and improved bit detection and error correction characteristics over longitudinal systems. However, the soft underlayer (e.g., 159) creates problems with data erasure which were not generally encountered with longitudinal recording systems. Referring again to FIG. 1A, when a longitudinal external field (e.g., $H_{Ion}$ 160 of FIG. 1A) is applied, soft underlayer 159 accentuates the collection of magnetic charges in the corners of structures, such as the recording head, which are in general contact with the air bearing surface. This can result in unwanted stray magnetic fields at those corners which can potentially erase stored data from recording medium 158.

Figure 1B:
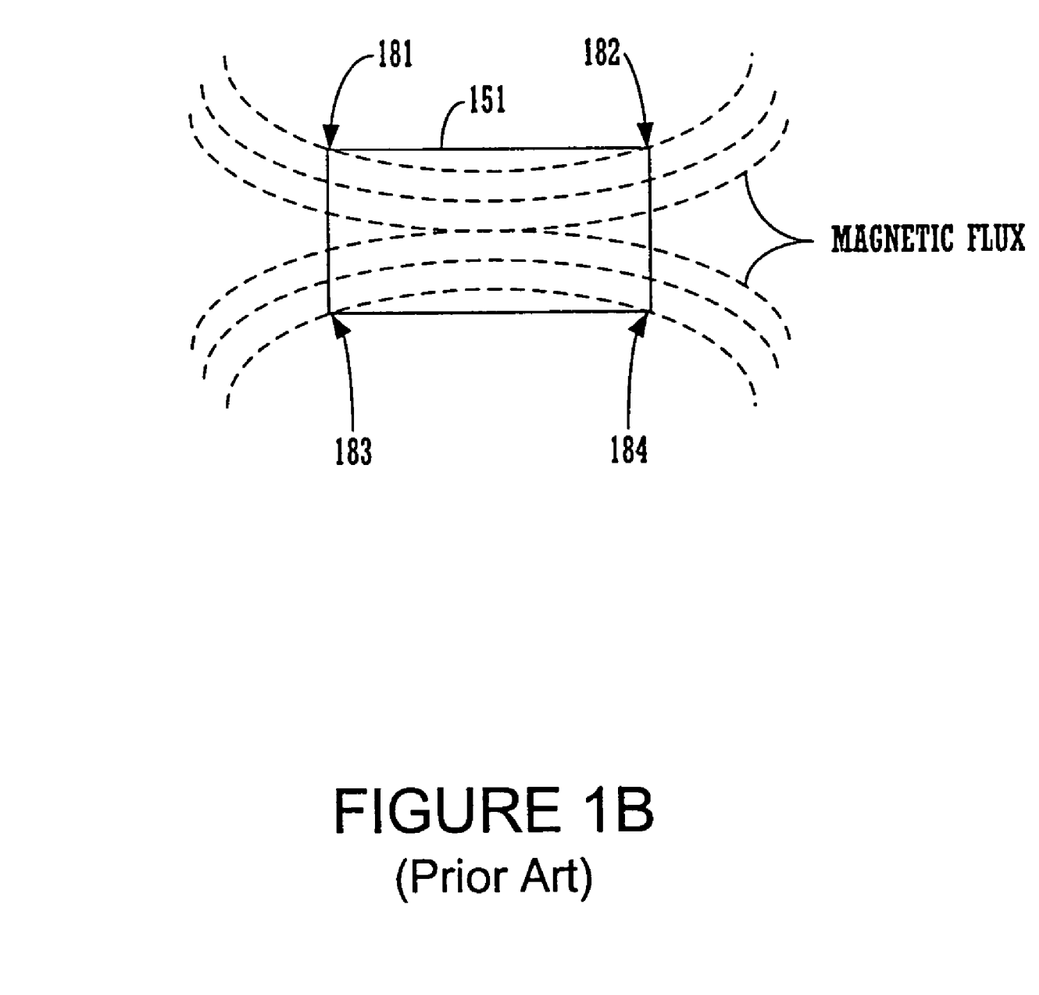
FIG. 1B is a top view showing the flow of magnetic flux lines past an exemplary conventional recording head.

FIG. 1B shows a top view of perpendicular recording, head 151. As shown in FIG. 1B, the magnetic flux becomes more focused in the region of perpendicular recording head 151. More specifically, the flow of the magnetic flux is focused at the corners (e.g., 181, 182, 183, and 184) of perpendicular recording head 151. Accordingly, magnetic charges gather at the corners (e.g., 181, 182, 183, and 184) of the recording head and can result in corner stray magnetic fields which can write on unwanted tracks or other locations, thereby erasing data from the storage medium.

Figure 2:
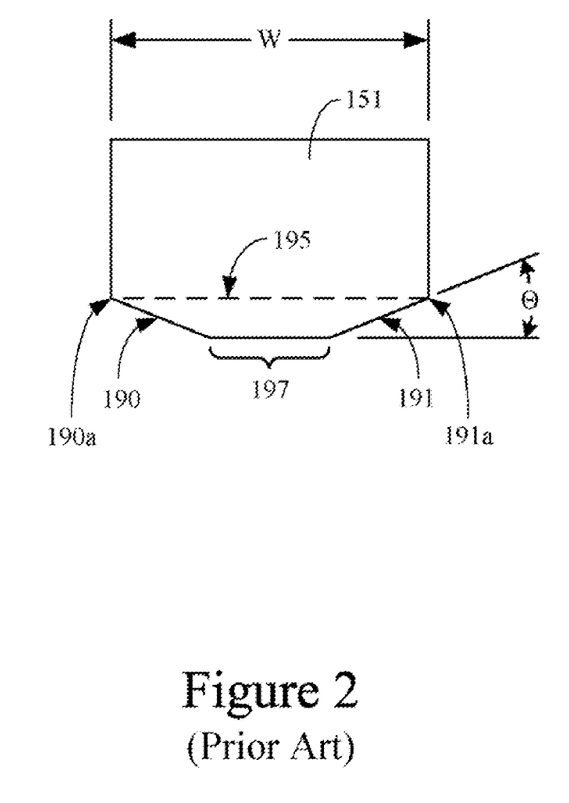
FIG. 2 is a top view of an exemplary conventional recording head having a beveled configuration.

FIG. 2 is a top view of an exemplary recording head. In FIG. 2, recording head 151 has beveled edges 190 and 191 on the corners of the surface which is exposed to the air bearing surface. It has been found that beveling the edges (e.g., beveled edges 190 and 191) of the recording head can reduce the amount of magnetic charge that can accumulate proximate to the storage medium. Instead, the build up of magnetic charges is generally in the regions of corners 190a and 191a. Furthermore, it has been found that a shallow angle of 10° or less (e.g., angle Θ of FIG. 2) is preferable to reduce the build up of magnetic charges proximate to the recording medium.

However, fabricating a recording head with the cross section shown in FIG. 2 is difficult and often prone to manufacturing errors. For example, if recording head 151 is maintained at a fixed width, the shallow angle of beveled edges 190 and 191 reduces the useful area (e.g., region 197) of recording head 151 to an unacceptable dimension. Alternatively, if the useful area of region 197 is widened to an acceptable dimension, the overall width of recording head 151 may be unacceptable.

Additionally, when the bottom surface of recording head 151 is being defined during fabrication, precise alignment of the definition mask is required. If the definition mask is misaligned, too much of the bottom surface of the recording head 151 may be removed, typically indicated by line 195, thus eliminating the beveled edges. For example, an error of as little as 0.5μ can eliminate the beveled edges from the beveled recording head. As a result, the advantage of beveling edges 190 and 191 is lost and unwanted stray magnetic field effects may be exhibited by recording head 151.

SUMMARY OF THE INVENTION

Accordingly, a need exists for reducing corner stray magnetic fields in structures in contact with the air bearing surface of a recording medium to eliminate the problems of data erasure caused thereby. While meeting the above stated need, it is desirable that structures aimed at reducing the above problem can be reliably and economically fabricated.

Embodiments of the present invention are directed to a recording head device having structure with a winged design for reduction of corner stray magnetic fields. In one embodiment, the present invention comprises a magnetic recording head comprising a plurality of components. In embodiments of the present invention, at least one of the plurality of components comprises a surface exposed to an air bearing surface when in operation with a recording medium. The surface of the recording head exposed to the air bearing surface comprises notched edges for constraining corner stray magnetic fields. Embodiments of the present invention are particularly useful in the field of perpendicular recording systems.

The winged design of the present invention reduces the accumulation of magnetic charges proximate to the recording medium that generally build up at corners of the recording head. As a result, embodiments of the present invention reduce the likelihood of corner stray magnetic fields erasing data from the recording medium. Additionally, embodiments of the present invention are easier to manufacture than conventional solutions for reducing corner stray magnetic fields.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

DETAILED DESCRIPTION OF THE INVENTION

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Figure 3:
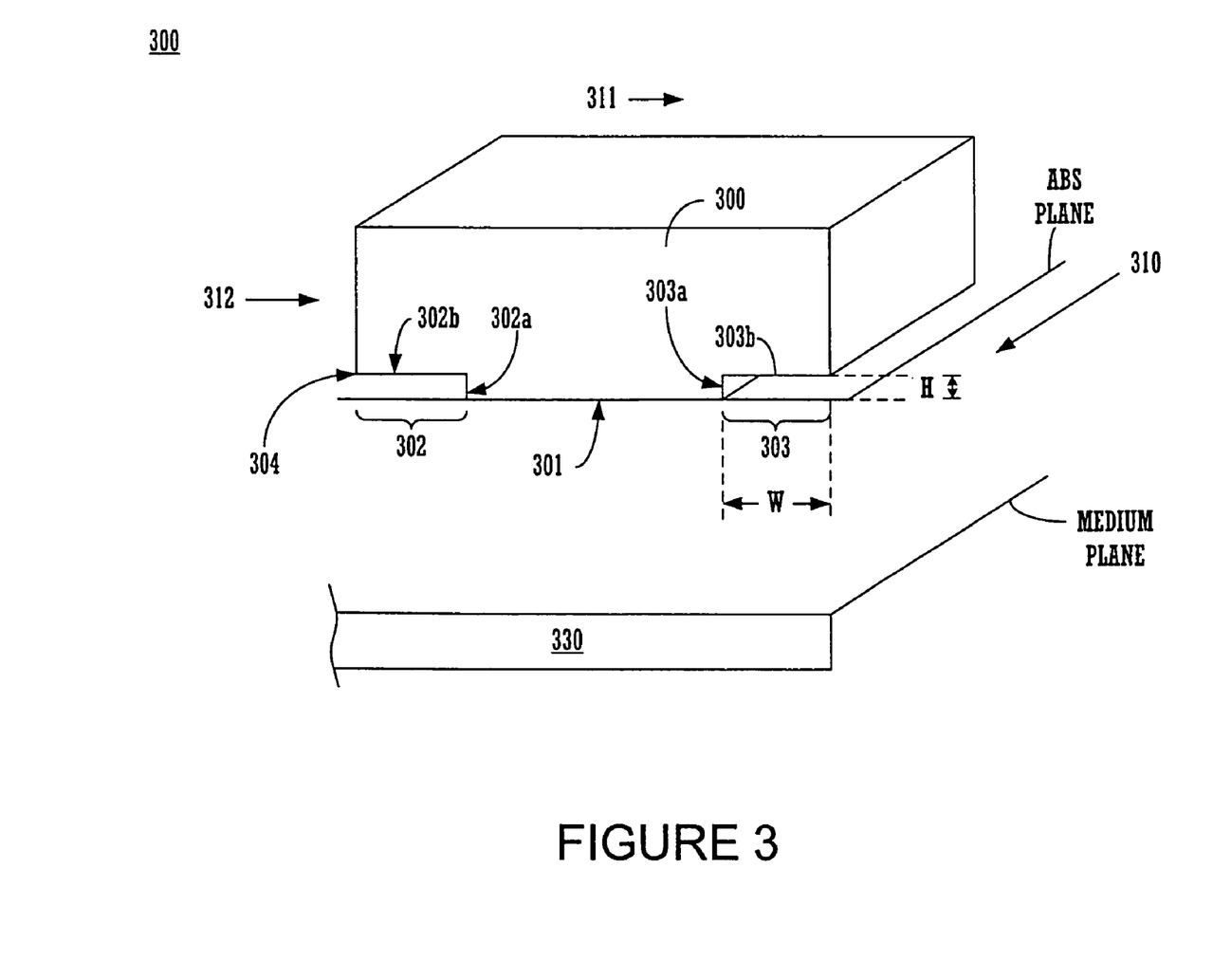
FIG. 3 is a perspective top view of an exemplary component of a magnetic recording head in accordance with embodiments of the present invention.
Figure 4A:
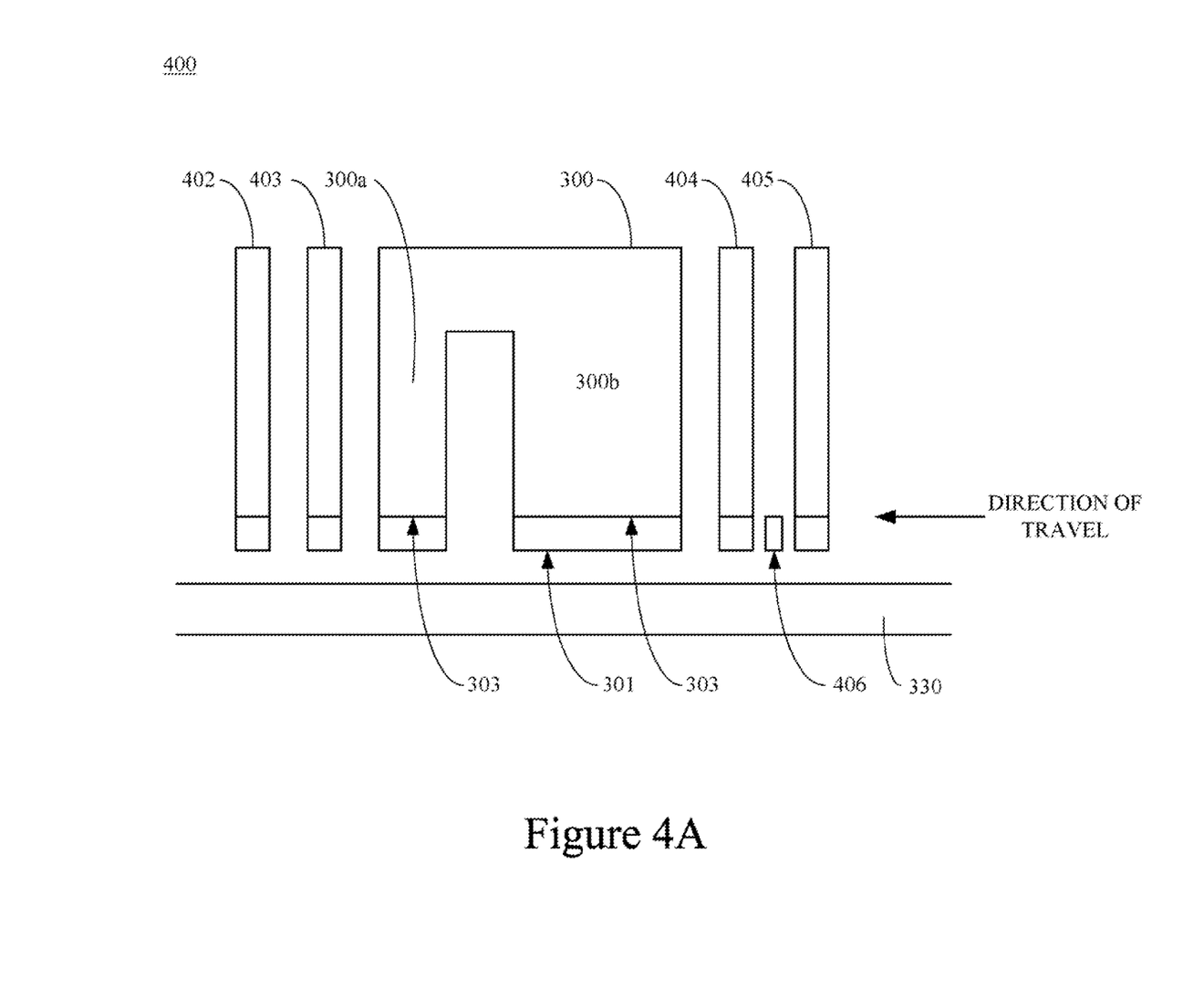
FIGS. 4A and 4B are a cross section view and a perspective cross section view respectively of an exemplary magnetic recording head in accordance with embodiments of the present invention.

FIG. 3 is a perspective top view of an exemplary component 300 of a magnetic recording head in accordance with embodiments of the present invention. In embodiments of the present invention, the configuration shown in FIG. 3 may be implemented on any magnetic recording element that makes contact with the air bearing surface (e.g., main pole 301a or a return pole 301b, of FIG. 4) and/or a shield component (e.g., shields 402-405 of FIG. 4) of a magnetic recording element.

Surface 301 of component 300 is in contact with the air bearing surface when the magnetic recording head is in operation. As shown in FIG. 3, outer edges 302 and 303 of surface 301 are notched, thus giving component 300 a "winged" appearance. In embodiments of the present invention, the notched edges (e.g., 302 and 303) extend the thickness of component 300 in the direction 310 that is parallel with the direction of travel of recording medium 330. In embodiments of the present invention, notched edges 302 and 303 reduce the magnitude of the magnetic charges which can accumulate proximate to the recording medium (e.g., in regions 302a and 303a) in the presence of an external magnetic field (e.g., $H_{Ion}$ 312) that is parallel to the component width direction (e.g., 311), thereby reducing the incidence of corner stray magnetic fields and eliminating the data erasure problems caused thereby. It is appreciated that the effectiveness of the disclosed winged structure does not necessarily depend on the precise angle of the notched edges 302 and 303. In other words, it is not required that regions 302a and 303a be perpendicular to the ABS plane. Similarly, while regions 302b and 303b are shown in FIG. 3 as being substantially parallel with the ABS plane, embodiments of the present invention do not require regions 302b and 303b to be precisely parallel with the ABS plane.

As stated above, the concentration of magnetic flux in the corner regions of magnetic recording head structures results in the collection of magnetic charges in the corner regions of component 300. However, because of the reduced height of regions 302a and 303a, less magnetic charge collects in these regions. The rest of the magnetic charge typically associated with the concentration of magnetic flux in magnetic recording head structures collects along the outer corner regions (e.g., 304) of component 300. However, because these outer corner regions are disposed at a greater height above the recording medium (e.g., 330) there is less likelihood of a corner stray magnetic field from the outer corner regions affecting data stored on recording medium 420. Furthermore, the collection of magnetic charge in the regions of notched edges 302 and 303 which are parallel with the air bearing surface (e.g., region 302b) is typically insufficient to result in stray magnetic fields which might erase stored data on the recording medium 330.

Embodiments of the present invention are helpful in reducing the concentration of flux (and thus the fields) at the corners that are exposed on the active surface of the head. The overall geometry and magnetic properties of the head structure and soft underlayer are the other factors that determine the absolute fields that appear at these corners and that are induced in response to write-current and/or external field. The relative sensitivities to write current and to external field components along various directions can be adjusted by changing the geometry of the head structure. For example, wider wings tend to decrease (improve) sensitivity to 'cross-track' external fields but increase (aggravate) sensitivity to 'perpendicular' external fields. The ability to make such trade-offs by tuning the geometry of the head structure is also very important in maximizing overall robustness of the recording system against external fields.

As a result, embodiments of the present invention can significantly reduce the incidence of corner stray magnetic fields in magnetic recording heads. Tests of embodiments of the present invention have shown a reduction of corner stray magnetic fields of up to 60% over prior magnetic recording heads which do not incorporate notched edges. Additionally, embodiments of the present invention can be reliably and economically fabricated.

In the prior art, corner stray magnetic fields can be reduced by beveling the corners of the surface of a recording head in contact with the air bearing layer. However, to realize a significant change in the corner stray magnetic field characteristics, a shallow angle bevel (e.g., 10° or less) is used in order to realize a desired level of performance.

However, implementing a shallow angle bevel on the recording head is difficult. For example, if the overall width of the recording head is not changed, the working end of the recording head (e.g., the surface in contact with the air bearing surface) may be become too small because of the amount of material that is removed from the head due to the shallow bevel angle.

Additionally, when the surface which is in contact with the air bearing surface is being defined during fabrication, precise alignment of the definition mask is required. If the definition mask is mis-aligned, too much of the bottom surface of the magnetic recording head may be removed, thus eliminating the beveled edges. While a more steeply angled bevel would reduce the risk of this happening, the desired level of protection from corner stray magnetic fields is not realized in this design.

The winged configuration of embodiments of the present invention is advantageous over beveled magnetic recording heads because an error in aligning the definition mask will not typically affect the size of the working area (e.g., surface 301 of FIG. 3) of component 300.

For example, in some embodiments of the present invention, the width (W) of notched edges 302 and 303 may be in a range of approximately five microns to one hundred microns (5μ-100μ) and the height (H) of notched edges 302 and 303 is in a range of approximately two tenths of a micron to three microns (0.2μ-3μ). Thus, an error in aligning the definition mask will not typically result in a reduction of the area of surface 301, nor will it eliminate the notched edges 302 and 303 of component 300. Thus, embodiments of the present invention are more tolerant of manufacturing variations while still providing a desired level of protection from corner stray magnetic fields. As a result, embodiments of the present invention may be manufactured more economically because mis-alignment of the definition mask is less likely to affect the performance of the magnetic recording head.

Figure 4B:
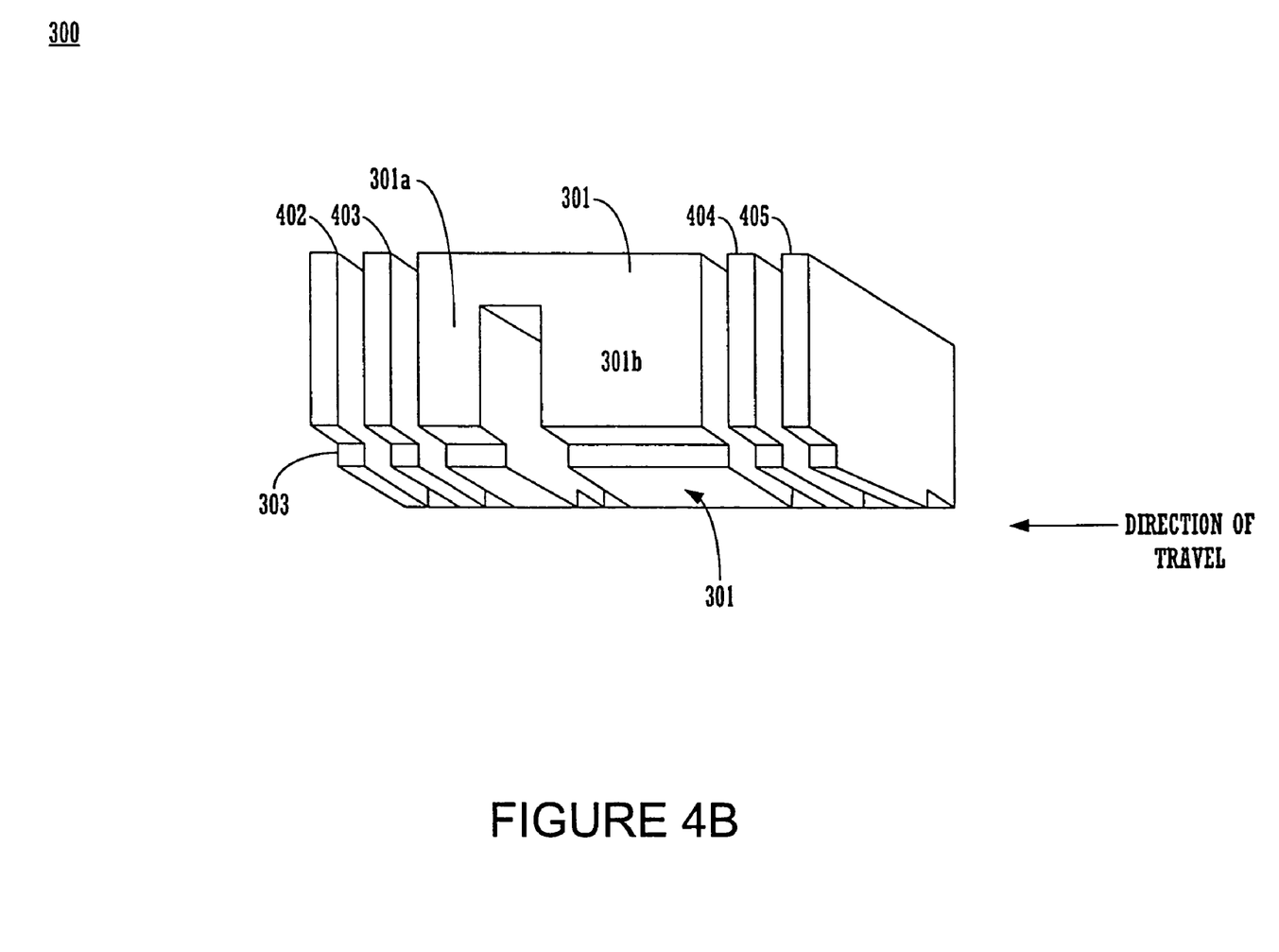

FIGS. 4A and 4B are side views of exemplary magnetic recording system 400 in accordance with embodiments of the present invention. In FIG. 4A, magnetic recording system 400 comprises a magnetic recording element 300 as described above with reference to FIG. 3, comprising a main pole 301a and a return pole 301b, a plurality of shields (e.g., 402, 403, 404, and 405), and a read head 406 disposed above a recording medium 320. In embodiments of the present invention, recording medium 320 comprises a soft underlayer. For purposes of clarity, the structures described above with reference to FIG. 3 will be discussed with reference to magnetic recording element 300. However, it is appreciated that the winged design of the present invention may also be equally implemented upon shields 402-405 as well to reduce stray magnetic flux attributed thereto. Furthermore, in the embodiments of the present invention, the total height of each of the shields 402-405 (e.g., from air bearing surface to the top of each respective shield) may be less than 20 microns (20 μ) to reduce susceptibility to vertical fields. This has the added advantage of improving longitudinal sensitivity.

Furthermore, it is appreciated that the configuration of my manic recording system 400 shown in FIGS. 4A and 4B are exemplary and that embodiments of the present invention may have a varying number and configuration of shields depending upon the needs of the design. For example, magnetic recording system 400 may only have one shield (e.g., 404) in one embodiment of the present invention, or may only have shields disposed upon one side of magnetic recording element 300 (e.g., shields 404 and 405). In one embodiment of the present invention, magnetic recording element 300 is a perpendicular recording bead for use in a perpendicular recording system. However, embodiments of the present invention are well-suited to be implemented on longitudinal recording heads and/or other structures that are in contact with the air bearing surface.

In accordance with embodiments of the present invention, at least one of the components of magnetic recording system 400 has notched edges (e.g., 303) on the surface 301 which is in contact with the air bearing surface when magnetic recording head 400 is in operation. As shown in FIGS. 4A and 4B, notched edge 303 extends the entire thickness of magnetic recording element 300 in the direction that is parallel with the direction of travel of recording medium 320.

Figure 5A:
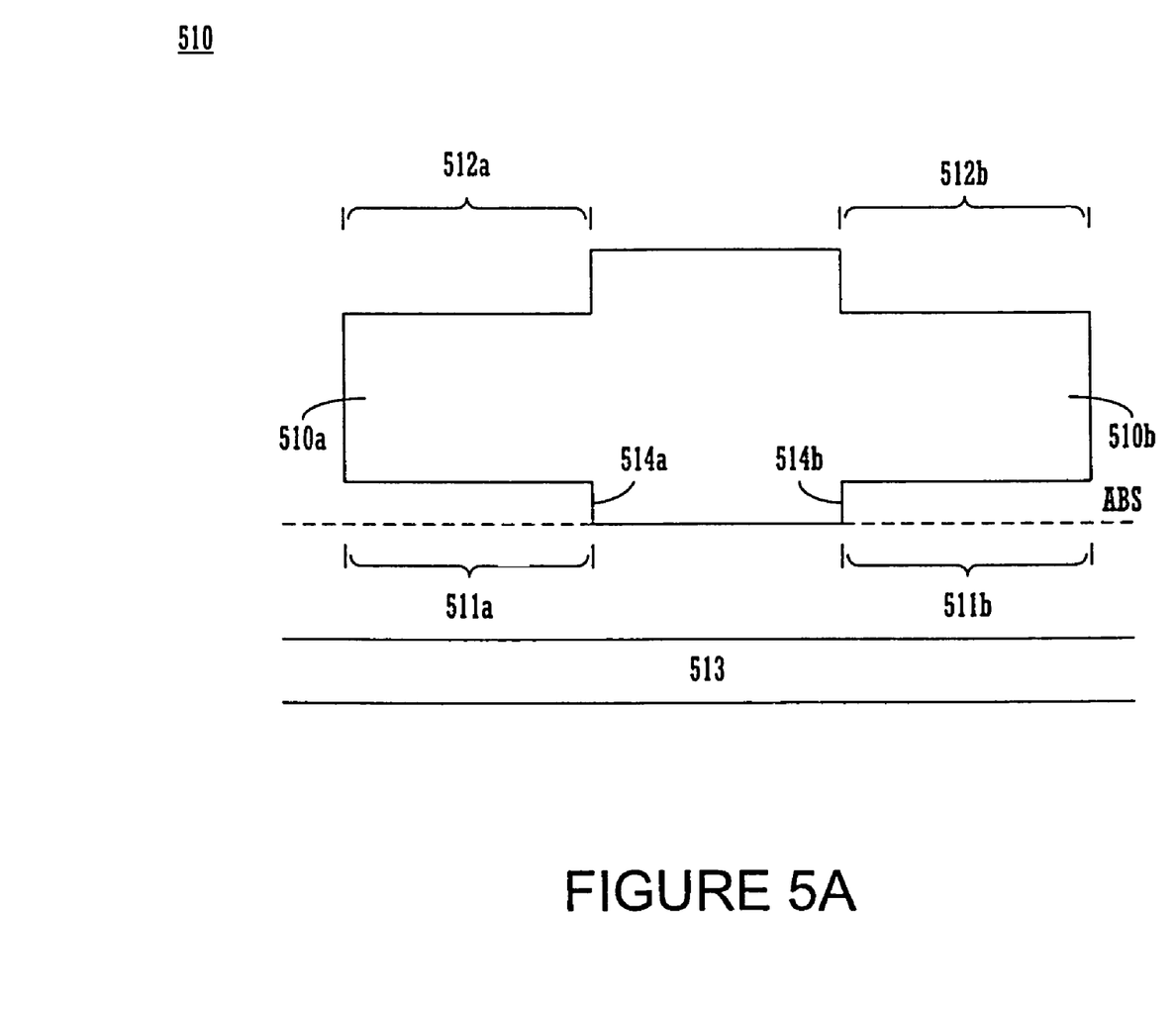
FIGS. 5A, 5B, 5C, and 5D are top views of exemplary magnetic recording head configurations in accordance with embodiments of the present invention.

FIGS. 5A, 5B, 5C, and 5D are top views of exemplary magnetic recording head configurations in accordance with embodiments of the present invention. In FIG. 5A, magnetic recording head 510 comprises short side wings (e.g., 510a and 510b) which are formed by notched edges 511a and 511b as well as notched edges 512a and 512b. As described above, in embodiments of the present invention notched edges 511a-511b and 512a-512b extend the thickness of component 500 in the direction that is parallel with the direction of travel of recording medium 513. In embodiments of the present invention, notched edges 511a and 511b reduce the magnitude of the magnetic charges which can accumulate proximate to the recording medium (e.g., in regions 514a and 514b) in the presence of an external magnetic field, thereby reducing the incidence of corner stray magnetic fields and eliminating the data erasure problems caused thereby. It is appreciated that the effectiveness of the disclosed winged structure does not necessarily depend on the precise angle of the notched edges 511a and 511b. In other words, it is not required that regions 514a and 514b be perpendicular to the ABS plane. Similarly, while the top portions of notched edges 511a and 511b are shown in FIG. 5A as being substantially parallel with the ABS plane, embodiments of the present invention do not require them to be precisely parallel with the ABS plane. In another embodiment, notched edges 511a and 511b may be angled from regions 514a and 514b to the outer edge of notches edges 512a and 512b.

Figure 5B:
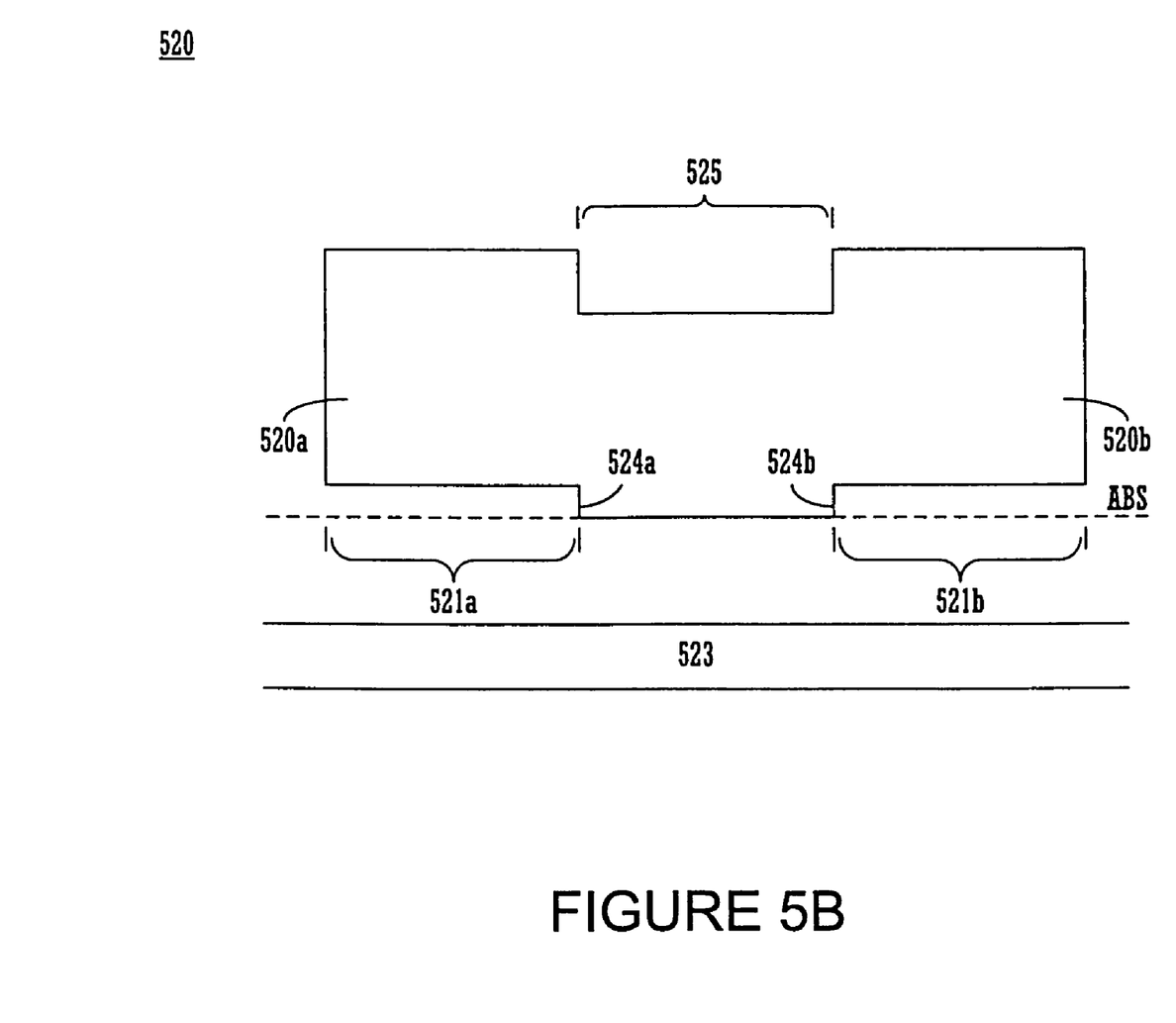

In FIG. 5B, magnetic recording head 520 comprises tall side wings (e.g., 520a and 520b) which are formed by notched edges 521a and 521b and which extend above the center region 525. As described above, in embodiments of the present invention notched edges 521a-521b extend the thickness of component 520 in the direction that is parallel with the direction of travel of recording medium 523. In embodiments of the present invention, notched edges 521a and 521b reduce the magnitude of the magnetic charges which can accumulate proximate to the recording medium (e.g., in regions 524a and 524b) in the presence of an external magnetic field, thereby reducing the incidence of corner stray magnetic fields and eliminating the data erasure problems caused thereby.

Figure 5C:
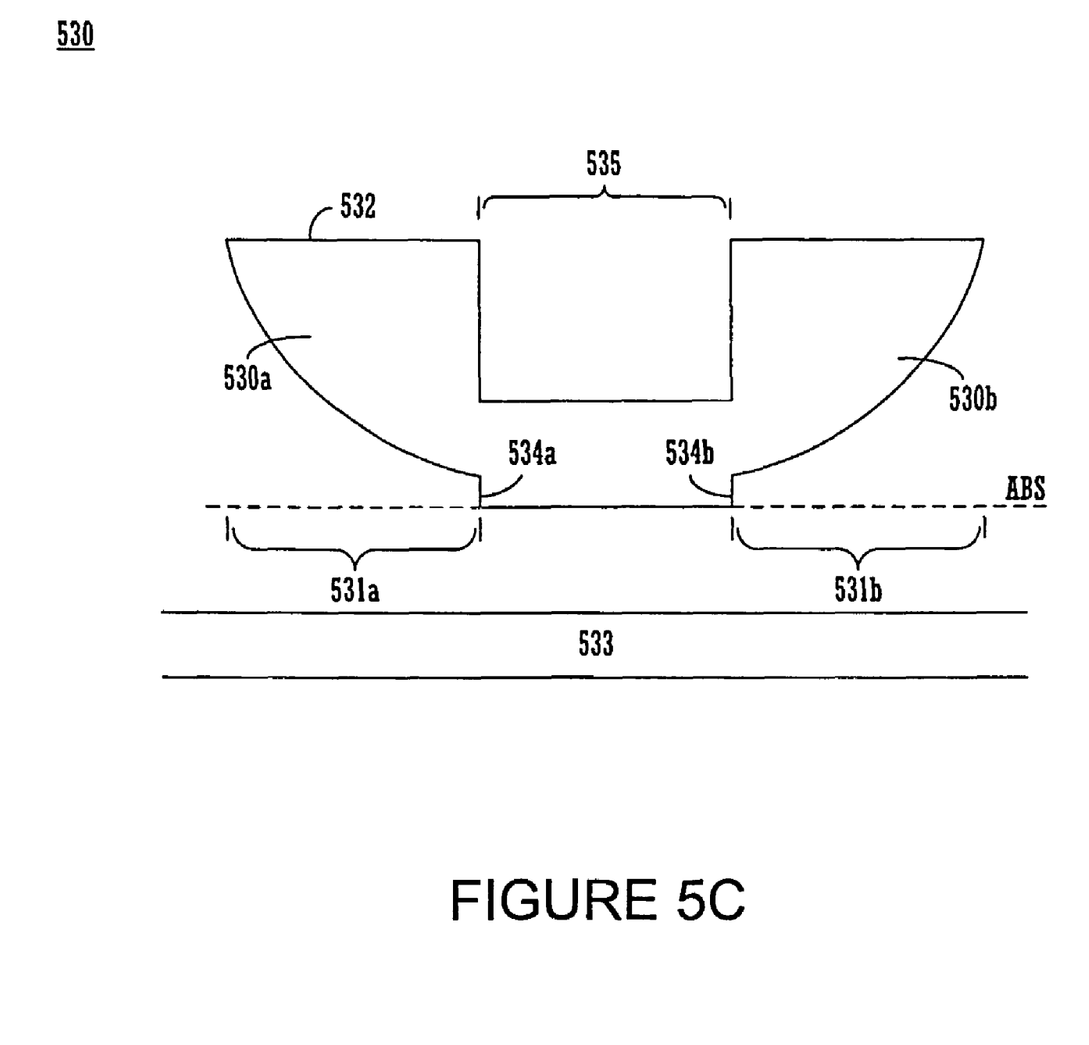

In the embodiment of FIG. 5C, magnetic recording head 530 comprises rounded side wings (e.g., 530a and 530b) which extend above the center region 535. In the embodiment of FIG. 5c, side wings 530a and 530b are formed by rounding the edges of notched edges 531a and 531b all the way to the top surface 532. As described above, in embodiments of the present invention notched edges 531a-531b extend the thickness of component 530 in the direction that is parallel with the direction of travel of recording medium 533. In embodiments of the present invention, notched edges 531a and 531b reduce the magnitude of the magnetic charges which can accumulate proximate to the recording medium (e.g., in regions 534a and 534b) in the presence of an external magnetic field, thereby reducing the incidence of corner stray magnetic fields and eliminating the data erasure problems caused thereby. It is appreciated that while FIG. 5C specifically shows rounded side wings, embodiments of the present invention are well suited to other configurations. For example, the rounded portions of side wings 530a and 530b may not extend all the way to top surface 532.

Figure 5D:
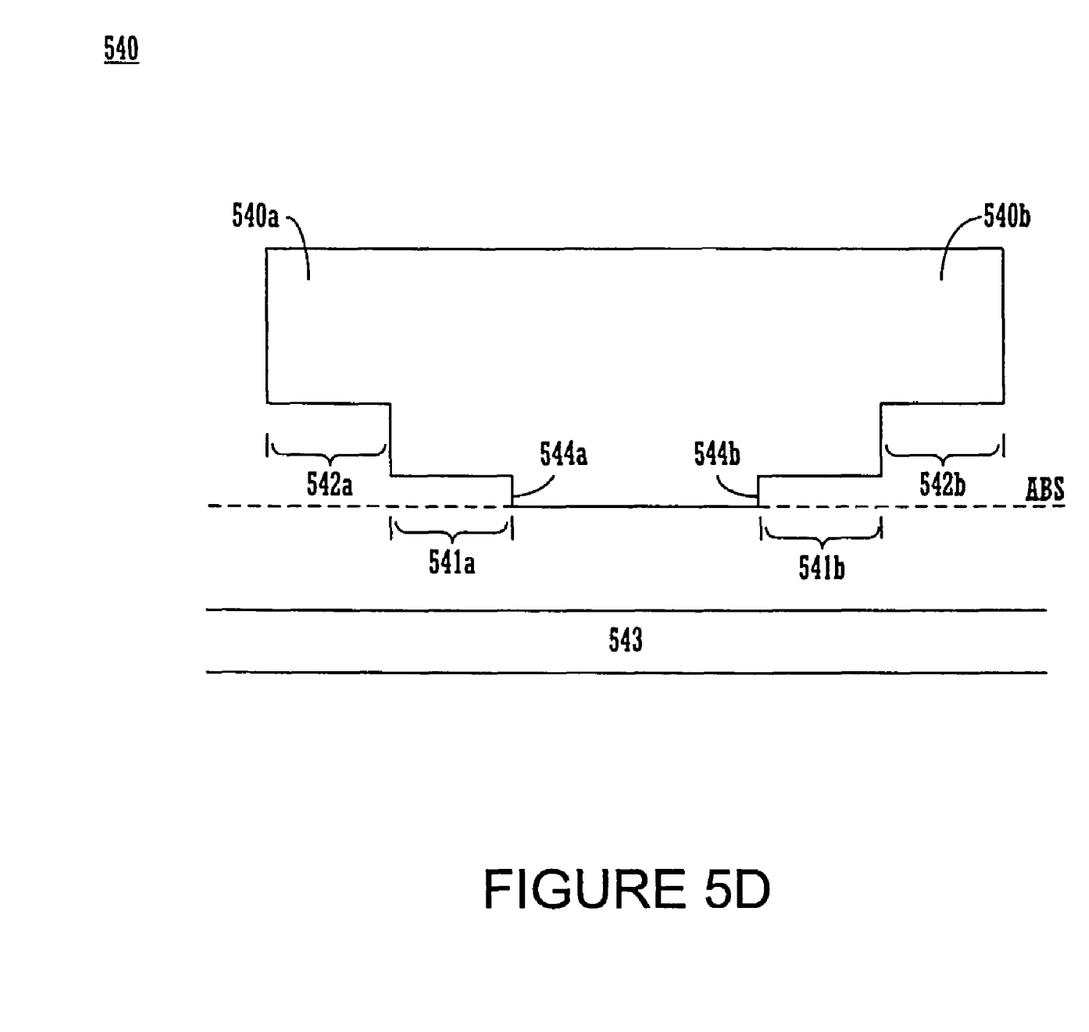

In FIG. 5D, magnetic recording head 540 comprises stepped side wings (e.g., 540a and 540b) which are formed by notched edges 541a and 541b and notched edges 542a and 542b. As described above, in embodiments of the present invention notched edges 541a-541b and 542a-542b extend the thickness of component 540 in the direction that is parallel with the direction of travel of recording medium 543. In embodiments of the present invention, notched edges 541a and 541b reduce the magnitude of the magnetic charges which can accumulate proximate to the recording medium (e.g., in regions 544a and 544b) in the presence of an external magnetic field, thereby reducing the incidence of corner stray magnetic fields and eliminating the data erasure problems caused thereby. Additionally, notched edges 542a and 542b may further reduce the magnitude of the magnetic charges which can accumulate proximate to the recording medium in the presence of an external magnetic field, thereby reducing the incidence of corner stray magnetic fields and eliminating the data erasure problems caused thereby.

The preferred embodiment of the present invention, a winged design for reducing corner stray magnetic fields, is thus described. While the present invention has been described in particular embodiments, it should be appreciated that the present invention should not be construed as limited by such embodiments, but rather construed according to the following claims.

What is claimed is:

1. A magnetic recording head comprising
   a magnetic recording element having an air bearing surface, wherein said air bearing surface of said magnetic recording element includes notched outer edges that extend the thickness of said magnetic recording element and are parallel with a direction of travel of said magnetic recording element; and
   a shield element having an air bearing surface, wherein said air bearing surface of said shield element includes notched outer edges that extend the thickness of said shield element and are parallel with a direction of travel of said shield element.

2. The magnetic recording head of claim 1 wherein said magnetic recording element comprises a perpendicular magnetic recording element.

3. The magnetic recording head of claim 1 wherein the overall height of said shield element is no more than twenty microns.

4. The magnetic recording head of claim 1 wherein:
   said notched outer edges of said magnetic recording element are disposed on opposite sides of said magnetic recording element: and
   said notched outer edges of said shield element are disposed on opposite sides of said shield element.

5. The magnetic recording head of claim 1 wherein:
   said notched outer edges of said magnetic recording element are approximately five microns to one hundred microns wide; and
   said notched outer edges of said shield element are approximately five microns to one hundred microns wide.

6. The magnetic recording head of claim 1 wherein:
   said notched outer edges of said magnetic recording element are approximately two tenths of a micron to three microns deep; and
   said notched outer edges of said shield element are approximately two tenths of a micron to three microns deep.

7. The magnetic recording head of claim 1 wherein:
   said notched outer edges of said magnetic recording element are adapted to constrain corner stray magnetic fields associated with said magnetic recording head; and
   said notched outer edges of said shield element are adapted to constrain corner stray magnetic fields associated with said magnetic recording head.

8. A magnetic recording head comprising:
   a pole having an air bearing surface, wherein said air bearing surface of said pole includes notched outer edges which extend the thickness of said pole and are parallel with a direction of travel of said magnetic recording head; and
   a shield having an air bearing surface, wherein said air bearing surface of said shield includes notched outer edges which extend the thickness of said shield and are parallel with a direction of travel of said magnetic recording head.

9. The magnetic recording head of claim 8 wherein said pole comprises a perpendicular magnetic recording element.

10. The magnetic recording head of claim 8 wherein the overall height of said shield is no more than twenty microns.

11. The magnetic recording head of claim 8 wherein said notched edges are disposed on opposite sides of each of said pole and said shield.

12. The magnetic recording head of claim 8 wherein said notched edges of said pole and said shield are approximately five microns to one hundred microns wide and are approximately two tenths of a micron to three microns deep.

13. A magnetic recording head comprising:
   a magnetic recording element having an air bearing surface; and
   a shield element having an air bearing surface, wherein the overall height of said shield element is no more than twenty microns and wherein said air bearing surface of said shield element and are includes notched edges approximately five microns to one hundred microns wide comprising rectangular recesses which extend along sides of said air bearing surface of said shield element and are parallel with a direction of travel of said magnetic recording head.

14. The magnetic recording head of claim 13 wherein said magnetic recording element comprises a perpendicular magnetic recording element.

15. The magnetic recording head of claim 13 wherein said notched edges are approximately two tenths of a micron to three microns deep.

16. A system for recording data, said system comprising:
   a recording medium; and
   a magnetic recording head including;
      a magnetic recording element having an air bearing surface when in operation with said recording medium, wherein said air bearing surface of said magnetic recording element includes notched edges disposed on opposite sides of said magnetic recording element and are parallel with a direction of travel of said magnetic recording head with respect to said recording medium; and
      a shield element having an air bearing surface when in operation with said recording medium, wherein said air bearing surface of said shield element includes notched edges disposed on opposite sides of said shield element and are parallel with a direction of travel of said magnetic recording head with respect to said recording medium.

17. The system of claim 16 wherein said magnetic recording head comprises a perpendicular magnetic recording head.

18. The system of claim 16 wherein the overall height of said shield element is no more than twenty microns.

19. The system of claim 16 wherein said recording medium comprises a soft underlayer.

20. The system of claim 16 wherein said notched edges are approximately five microns to one hundred microns wide and are approximately two tenths of a micron to three microns deep.

* * * * *